Oct. 2, 1951     T. E. PHILIPPS     2,569,575
AIR FILTER
Filed March 5, 1948
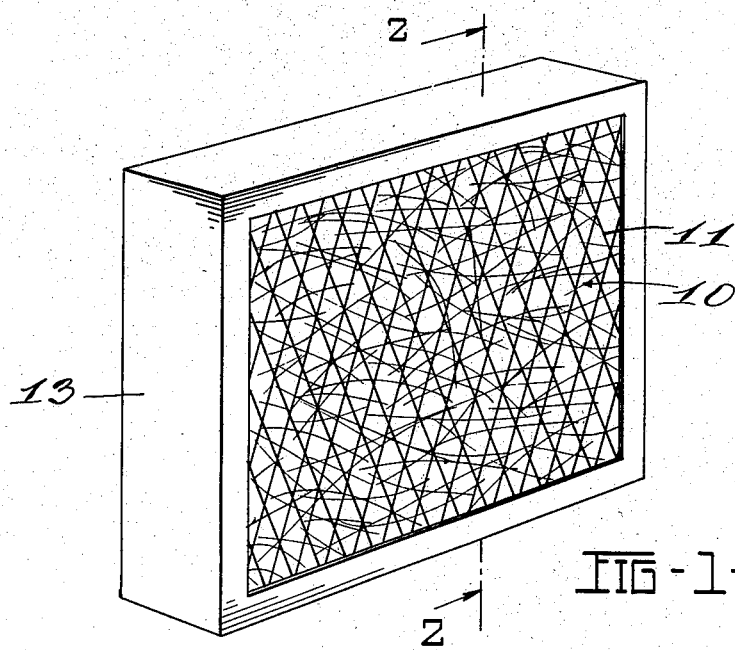
FIG-1-
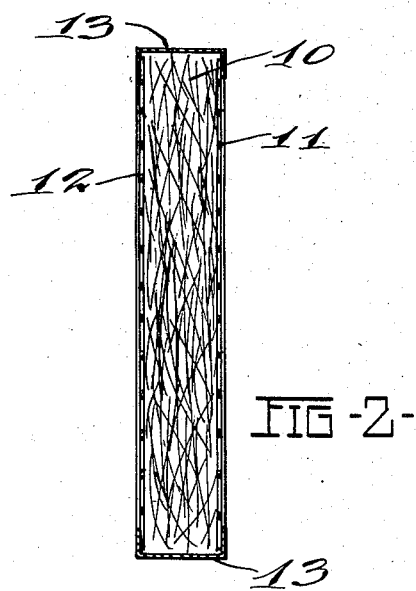
FIG-2-
Inventor:
THOMAS E. PHILIPPS
By Staehlin & Overman
Attorneys Patented Oct. 2, 1951

2,569,575

UNITED STATES PATENT OFFICE 2,569,575

AIR FILTER

Thomas E. Philipps, Granville, Ohio, assignor to Owens-Corning Fiberglas Corporation, a corporation of Delaware Application March 5, 1948, Serial No. 13,329

14 Claims. (Cl. 183—45)

This invention relates to filters for separating out solid particles, such as dust from air or other gaseous media. More particularly, the invention relates to a dust catching adhesive or air filtering material on a porous base, such as a glass fiber base, through which the gaseous medium flows.

A desirable dust catching adhesive should be inexpensive, odorless and have a large dust collecting capacity. It has been found that the adhesive is effective while it remains relatively soft or in semi-fluid condition, thus solidification at low temperature or crystallization at low humidities causes substantial failure in operation. On the other hand, the efficiency of the filter is impaired if the material becomes so fluid at elevated temperature or high humidities as to run or bleed from the base fibers. Of further importance is the reaction of the adhesive to high temperatures and flames; that is, it should be non-inflammable and non-combustible and should not create fumes or smoke of such volume, density or kind as to be toxic or incite a panic.

Referring briefly to the adhesive materials that have been used, petroleum oils, bodied or unbodied, and with or without bodying agents, such as soaps, have been employed but they are objectionable because they not only slowly run or bleed from the base but also the oily substances are inflammable. Flame-proof chlorinated compounds, such as chlorinated diphenyl, have been added to these oils, but, when used in amounts to be effective in reducing the combustibility of the adhesive, they form a sludge or solid mass with oil, which as previously pointed out, is undesirable.

Use has been made of the deliquescent salts or metal halides, such for example as zinc chloride, tin chloride or lithium chloride, but these materials are corrosive to metal frames and duct work, presence of moisture, and may crystallize out at very low humidities. Organic esters of phosphoric acid, such as tricresyl phosphate, although not combustible, decompose at elevated temperatures and phosphorous in the form of phosphorous pentoxide ($P_2O_5$) appears as a part of the decomposition products. These dense white fumes have been known to cause greater panic than might have resulted from a visible flame.

An object of this invention is to produce a dust catching adhesive which is inexpensive, odorless, non-corrosive, has a large dust catching capacity, and has the additional features of being relatively free from the objections to the materials heretofore used.

Another object is to produce a wholly non-combustible, non-inflammable adhesive, the decomposition products of which do not form dangerous vapors or fumes.

A further object is to produce a liquid dust catching material, which is relatively insensitive to changes in temperature and humidity so that it maintains its effective condition on the supporting base.

A still further object is to produce a dust catching adhesive based on a non-combustible phosphorous containing compound constituted with ingredients capable of reacting with the phosphorous at decomposition temperatures substantially to prevent its release to the atmosphere.

It has been discovered than an organo-metallic (organo-inorganic) salt of an acid of phosphorous is a material having the properties desired in a non-combustible, non-fuming, odorless, low cost and efficient dust catching adhesive. These might also be referred to as inorganic esters or organo-metallic esters of an acid of phosphorous. When the phosphorous is present as the phosphate, the organo-metallic salt may be represented by the formula $R_nM_{3-n}PO_4$, where R is a monovalent organic radical or derivative thereof represented by the aliphatics, such as methyl, ethyl, propyl, butyl, isobutyl, amyl and others; aromatics and mixed aliphatic-acromatics, such as phenyl, benzyl, tolyl, xylyl, ethylphenyls, naphthyls, phenylethyls and the like; alicyclics and heterocyclics, such as cyclopentyl, cyclohexyl, furfuryl, and the like. When aliphatic, the group may be saturated or unsaturated, substituted or unsubstituted. M preferably is an alkali metal of the type lithium, sodium, potassium and the like but may also be ammonia or an amine or mixtures of these with the metals, and $n$ is either 1 or 2, unless M is an amine, such for example as mono-, di-, or triethanolamine, in which case $n$ may be zero.

Representative of suitable organo-metallic salts of phosphoric acid are; di-methyl sodium phosphate, di-ethyl sodium phosphate, methyl ethyl potassium phosphate, methyl ethyl sodium phosphate, sodium ethyl potassium phosphate, methyl potassium sodium phosphate, di-sodium butyl phosphate, methyl di-sodium phosphate, ethyl di-potassium phosphate, iso-butyl sodium ethyl phosphate, ethyl sodium ammonium phosphate, methyl sodium ammonium phosphate, methyl potassium ammonium phosphate, ethyl triethanolamine potassium phosphate, methyl triethanolamine potassium phosphate, ethyl triethanolamine ammonium phosphate, methyl triethanolamine ammonium phosphate, ethyl triethanolamine sodium phosphate, methyl triethanolamine sodium phosphate, methyl triethanolamine phosphate, triethanolamine phosphate, triethanolamine ammonium phosphate, phenyl triethanolamine sodium phosphate.

The preferred salts are water soluble and liquid under ordinary atmospheric conditions. Application thereof is made to the base by ordinary means such as flow coating, spraying, dip-squeezing and the like from an aqueous solution in which the concentration of the salt may be varied from 20 to 75 per cent by weight, a satisfactory deposit being made from about a 60 per cent solution. The organo-metallic salt generally remains liquid after the diluent has been driven off and in that condition readily wets the surfaces of the glass fibers so that a stable and effective filter is secured. Furthermore, the inherently smooth surfaces of the glass fibers provide little resistance to the flow of the gaseous medium, while little adhesive is actually required thoroughly to saturate the fiber surfaces because these glass fibers are non-absorbent.

Some of the adhesive materials are more hygroscopic than others, that is, they absorb greater amounts of water at high humidities, while others, such as the di-metallic salts, methyl sodium potassium phosphate, di-sodium ethyl phosphate and others tend to form crystalline masses at very low humidities, for example, below 15 per cent relative humidity.

According to this invention, it is found that crystallization at low humidities may be eliminated and the absorption of water reduced if a polyhydric alcohol, such as glycerine, ethylene glycol, trimethylene glycol, tetramethylene glycol and the like, and especially if polymers thereof are incorporated with the organo-metallic salt. Preferred glycols are the polyethylene glycols, commercially known as "Carbowax," produced by the Carbide and Carbon Chemical Corporation of New York, New York. The use of polymers of less than 1000 molecular weight is most desirable because they are liquid at room conditions and are able to operate also as a solvent for the organo-metallic salts of phosphorous, in which manner they are believed to prevent crystallization at low humidity.

In specific application, the adhesive may be composed of 2 parts of the organo-metallic salt to 1 part of the polyhydric alcohol, although as much as equal parts of each have been successfully used and, where the metallic component in the salt is less, less of the polyhydric alcohol may be used. It may be entirely eliminated when an amine or organo-ammonium phosphate is employed because neither of these crystallizes at low humidities. The hygroscopicity of the phosphoric acid esters, such as tricresyl phosphate, has been effectively reduced by the presence of these polyhydric alcohols and polymers thereof.

In actual practice, the glass fibers of the base are readily wet by the non-inflammable organic-inorganic salt of phosphoric acid, and, in view of the great amount of surface area made possible by the use of glass fibers, an efficient filter is produced. As previously pointed out, most of these salts remain liquid at any humidity, and if not, non-volatile liquid alcohols, which dissolve the salts and maintain them in liquid form, are incorporated. These salts are quite stable up to temperatures which cause the breakdown or volatilization of the organic groups, such as at 450° F. At such relatively high temperatures, the metallic constituents seem to combine with the phosphorous to form more stable salts or what appears as a new glassy phase, effectively to tie up the phosphorous so that very little escapes to the atmosphere. Otherwise, the phosphorous would come forth as dense white fumes of $P_2O_5$, which in crowded quarters, are frightening and have been known to cause disastrous panics.

Thus there is produced an efficient filter composed of an inert base, which offers little resistance to the flow of the gaseous medium, and adhesive material, which is for the most part non-combustible and non-fuming, it being understood that the decomposition products of the small amount of organic-matter are not in sufficient concentration to produce a lasting flame.

This invention is not limited to the application of these dust catching adhesives to bases or media formed only of glass fibers, but other porous bases formed of a combination of glass fibers with other materials or formed exclusively of other materials such as metal, paper, cellulosic materials or other filtering media may also be used.

Preferably the filter medium is in the form of a pad or mat of substantially less thickness than width and length. This pad is enclosed between grilles or perforated metal or paper facings that overlie the major faces of the pad. The air to be filtered passes in turn through one of the grilles, the inlet grille, through the pad in the direction of its thickness, and out through the other grille, the outlet grille. The pad and grilles are usually secured together by a frame or container that encloses the edges and margins of the pad and grilles. An air filter unit of this type is shown in the Myers Patent No. 2,077,951.

For example, on the accompanying drawing:

Figure 1 is a perspective view of one form the unit or container of the present invention may take, and Figure 2 is a cross-section of Figure 1 taken on the line 2—2.

Referring to these figures, a pad or mat of glass fibers 10 containing a dust catching adhesive of the present invention is enclosed between two similar, parallel grilles 11 and 12. The entire assembly is then secured as by stapling to a cardboard frame 13 which covers the edges and margins of the pad and grilles. If desired, a paper tape may be adhered to the unit around its perimeter to impart further rigidity.

It is to be understood that various modifications of materials and concentrations may be made without departing from the scope of the invention especially as defined in the following claims.

I claim:

1. A filter comprising a porous filtering base, and a dust catching adhesive on said base in the form of an organo-inorganic salt of an acid of phosphorous.

2. A gaseous filter comprising a gaseous permeable base of glass fibers, and a coating on the fibers of an organo-inorganic salt of phosphoric acid in which the inorganic component is an inorganic material capable of forming a salt with an acid of phosphorous and selected from the group consisting of the alkali metals, ammonia and amines and mixtures thereof.

3. A filter unit comprising a container, glass fibers within said container, and a liquid coating on the surface of the glass fibers consisting essentially of an organo-metal-amine phosphate.

4. A filter comprising a porous base with glass fibers, and an impregnant interspersed throughout the porous base and comprising a compound represented by the formula $R_nM_{3-n}PO_4$ in which R is a monovalent organic radical, M is an inorganic selected from the group consisting of an alkali metal, ammonia and an amine and $n$ is an integer between 1 and 2 unless M is an amine in which case $n$ may be zero.

5. A filter material comprising a glass fiber base, and a coating on the fibers composed of a solution containing a water soluble phosphate represented by the formula $R_nM_{3-n}PO_4$ in which R is a monovalent organic radical, M is an alkali metal, and $n$ is an integer between 1 and the numeral 2, and a solvent for said phosphate selected from the group consisting of polyhydric alcohols and polymers thereof.

6. A filter material comprising a glass fiber base, and a liquid coating on the fibers consisting of an organo-inorganic salt of an acid of phosphorous and a polyhydric alcohol.

7. A filter material comprising a glass fiber base, and a liquid coating on the fibers consisting of an organo-inorganic salt of an acid of phosphorous, and a polymer of a polyhydric alcohol.

8. A filter material as claimed in claim 7, in which the ratio of the polymer of the polyhydric alcohol to the salt is less than 2 to 3.

9. A gas filter comprising a porous fibrous base and a liquid coating thereon of a composition containing an organo-metallic ester of an acid of phosphorous and less than 30 per cent by weight thereof of polyethylene glycol.

10. An air filter material comprising a base of glass fibers and a composition on the surfaces of the fibers consisting of a phosphoric acid ester and a polyglycol.

11. A filter unit comprising a container, an air-pervious face through which air to be filtered enters the container and a second air-pervious face through which filtered air leaves the container, and a filtering medium between said pervious faces composed of glass fibers coated with an organo-metallic salt of an acid of phosporous represented by the formula $R_nM_{3-n}PO_4$ in which R is a monovalent organic radical, M is an inorganic selected from the group consisting of an alkali metal, ammonia and an amine and $n$ is an integer between 1 and 2 unless M is an amine in which case $n$ may be zero.

12. A dust filter comprising a porous filtering base of glass fibers and a dust collecting adhesive on the glass fiber surfaces consisting essentially of a water soluble organo metallic salt of an acid of phosphorous in which the organic group is selected from the monovalent groups consisting of aliphatic, aromatic and mixed aliphatic-aromatic radical in which the aromatic group is based upon a single ring structure and in which the aliphatic is a lower aliphatic group.

13. A dust filter comprising a porous filtering base of glass fibers and a dust collecting adhesive on the glass fiber surfaces consisting essentially of an organo-alkali metal salt of an acid of phosphorous.

14. A dust filter comprising a porous filtering base of glass fibers and a dust collecting adhesive on the glass fiber surfaces consisting essentially of a lower aliphatic-inorganic salt of an acid of phosphorous.

THOMAS E. PHILIPPS.

REFERENCES CITED

The following references are of record in the file of this patent:

UNITED STATES PATENTS

| Number | Name | Date |
|---|---|---|
| 2,071,353 | Morgan | Feb. 23, 1937 |
| 2,083,132 | Williams et al. | June 8, 1937 |
| 2,122,514 | Crocker | July 5, 1938 |
| 2,128,782 | Muller | Aug. 30, 1938 |
| 2,145,898 | Simpson | Feb. 7, 1939 |
| 2,178,614 | Slayter | Nov. 7, 1939 |
| 2,262,634 | Cobbs | Nov. 11, 1941 |
| 2,353,936 | Smith | July 18, 1944 |
| 2,415,113 | Seymour et al. | Feb. 4, 1947 |

FOREIGN PATENTS

| Number | Country | Date |
|---|---|---|
| 365,012 | Great Britain | Jan. 14, 1932 |